Feb. 25, 1964 — V. T. GABRIEL ETAL — 3,122,700

TEMPERATURE-COMPENSATED SATURABLE REACTORS

Filed July 3, 1958

Inventors:
Vincent T. Gabriel,
Erich W. Manteuffel,
by Allen E. Amgott
Their Attorney.

United States Patent Office 3,122,700
Patented Feb. 25, 1964

3,122,700
TEMPERATURE-COMPENSATED SATURABLE
REACTORS
Vincent T. Gabriel, Syracuse, and Erich W. Manteuffel,
Ithaca, N.Y., assignors to General Electric Company, a
corporation of New York
Filed July 3, 1958, Ser. No. 746,401
8 Claims. (Cl. 323—89)

The present invention relates to saturable reactors and more particularly to compensating means to correct for changes of coercive force of saturable reactors with ambient temperature.

Saturable reactors have been employed in various types of control, regulating and measuring systems. Where such reactors are utilized under conditions of extreme variations in temperature, it is of extreme importance that the external characteristics of these reactors be as accurate as possible. This is particularly true if the reactors are used in small magnetic preamplifiers where the error existing between a desired and a given function is applied as ampere-turns to the signal windings. For example, where an ideally accurate reference is available in a regulator, considerable error may still be introduced by variations and shifts of the transfer characteristics of magnetic amplifiers. These shifts are produced by variations in ambient temperature causing changes in the coercive force of the hysteresis loop of the reactor cores.

It is well known in the art that the coercive force of reactor cores exhibiting a rectangular B-H curve is subject to considerable changes with variations in temperature. Where the core is subject to increasing temperature changes, the width of the loop decreases. In certain materials the change in coercive force is approximately 25 percent per 100 degree, centigrade change. When magnetic amplifiers or saturable reactors are to be operated within a wide range of temperatures, extreme care must be taken to reduce the influence of varying coercive force on their transfer characteristics. With the advent of silicon rectifiers influences caused from variations of reverse resistance with temperature changes have been reduced to an almost negligible amount. Thus, the influence of change in coercive force becomes a predominant problem.

It is an object of the present invention to provide compensating means to minimize the influence of varying coercive force of saturable reactors with temperature changes.

Another object of the invention is to provide resistive elements having negative temperature coefficients in parallel with the gate windings of saturable reactors to compensate for variations in the dynamic loop width of the core material due to temperature changes.

Still another object of the invention is to provide resistive elements having negative temperature coefficients in series with the load circuit of saturable reactors to compensate for gain variations therein.

Other objects and many of the attendant advantages of this invention will be readily appreciated as the same becomes better understood by reference to the following detailed description when considered in connection with the accompanying drawings wherein.

Figure 1:
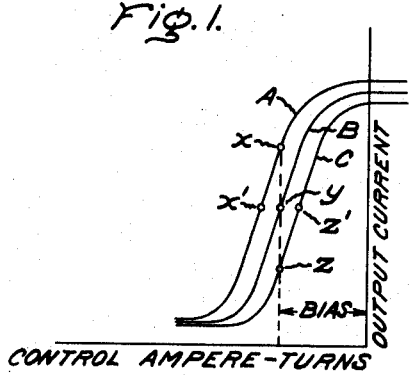
FIGURE 1 is a graphical presentation of three typical transfer characteristics of output current (or voltage) versus control ampere-turns of a self-saturating, magnetic amplifier.

The operational characteristics of self-saturating magnetic amplifiers are influenced greatly by the property of changing width of the hysteresis loop of the saturable reactors. In FIGURE 1 there is illustrated three typical transfer characteristic curves of output current (or voltage) versus control ampere-turns. Curve A represents a transfer characteristic taken at low temperature; curve B indicates a transfer characteristic taken at a medium temperature; and, curve C illustrates the transfer characteristic taken at high temperature. Where the amplifier is biased to operate at point $y$ on transfer curve B, at a higher temperature it would operate at point $x$ on curve A and at the lower temperature it would operate at point $z$ on curve C. It will be recognized by those skilled in the art that not only the quiescent output current of the amplifier has changed, but also the operating range is no longer in the linear region. In order to correct for such variations in temperature one could change the bias to a different value so that with variations in temperature the transfer curves would be brought back to either point $x'$ or $z'$ from points $x$ and $z$ respectively. This method requires resistance with a large positive temperature coefficient within the bias circuit. Such resistors are not easily obtainable and are large in size because of the good conductivity of their materials. Further, a well regulated bias source is required to accomplish this correction.

In order to overcome the undesirable results arising from variations in coercive force, temperature-compensating means are herein provided. Briefly, the present invention comprises the employment of at least one resistive element having a negative temperature coefficient connected in parallel with the gate winding of a saturable reactor and placed in the same temperature environment.

Figure 2:
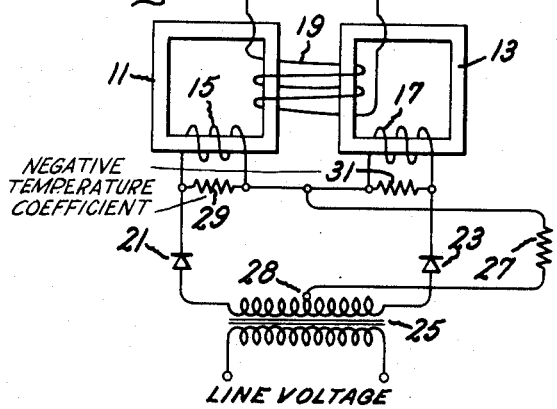
FIGURE 2 is a wiring diagram of a center-tap magnetic amplifier illustrating one embodiment of the present invention.

In FIGURE 2 there is provided one embodiment of the invention wherein a center-tap magnetic amplifier employs a resistive element having a negative temperature coefficient in parallel with the gate winding of each of the saturable cores. It is to be understood that the use of a center-tap magnetic amplifier is by way of illustration only and that the invention may be practiced with other types of magnetic amplifiers and saturable reactor configurations. Said center-tap magnetic amplifier includes a pair of cores 11 and 13 upon each of which there is wound gate windings 15 and 17, respectively. A control winding 19 is wound around both cores 11 and 13. Connected to one end of each gate winding 15 and 17 is a silicon rectifier 21 and 23, respectively. The other side of each of said silicon rectifiers 21 and 23 is connected across one winding of transformer 25, the other winding of said transformer being connected to a suitable source of voltage. The other ends of gate windings 15 and 17 are serially connected. Load resistor 27 is connected between the center tap 28 of the winding of transformer 25 and to the common ends of gate windings 15 and 17.

Two resistive elements 29 and 31 having negative temperature coefficients are connected in parallel with gate windings 15 and 17 respectively and placed in the vicinity of the saturable reactors or the same temperature environment. The placing of resistive elements 29 and 31 in parallel with gate windings 15 and 17 has the same effect as if the eddy current losses of the core were increased. Thus, the dynamic loop of the core is widened. Widening of the dynamic loop results in a shift of the point of minimum load current to the left, simulating the same effect as caused by lowering the ambient temperature. It is to be observed that resistive elements 29 and 31 can be replaced by one resistive element 33 having a negative temperature coefficient (shown in dotted form in FIG-URE 2) connected across both gate windings. This will produce the same result as the two resistive elements 29 and 31.

Figure 3:
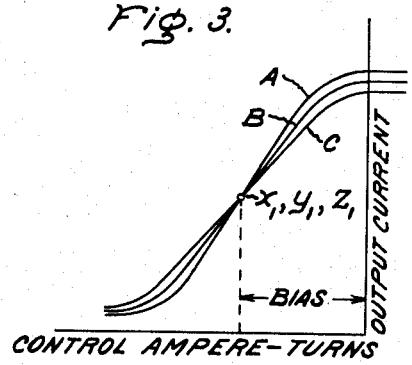
FIGURE 3 is a graphical presentation of the transfer characteristics of output current versus control ampere-turns of the embodiment of FIGURE 2.

It will be recognized that at low temperature resistive elements 29 and 31 or resistive element 33 represent a large resistance, thereby causing only a minor shift to the left of the transfer characteristics of the output current versus control ampere-turns as shown in FIGURE 3. However, at high temperature, the resistive element 33 represents a low resistance resulting in a greater shift of the lower knee of the characteristic curve to the left. From the above, it will be seen that it is possible to obtain transfer characteristics as shown in FIGURE 3. Resistive elements 29 and 31 or resistive element 33 are so chosen that the characteristics cross over at a point within their linear region such as points $x'$, $y'$, $z'$ in FIGURE 3. The employment of resistive elements 29 and 31 or resistive element 33 in the circuitry of FIGURE 2 eliminates shifts of the operating range of said amplifier due to variations in ambient temperature. However, it will be noted that there occurs a decrease in amplifier gain or variations in amplifier gain with varying temperatures.

Figure 4:
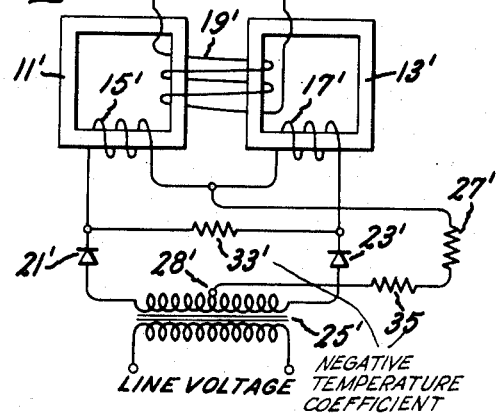
FIGURE 4 is a wiring diagram illustrating an alternate embodiment of the invention of FIGURE 2.
Figure 5:
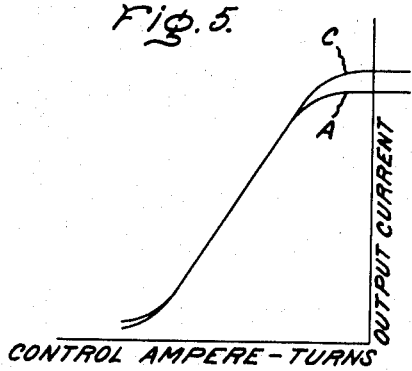
FIGURE 5 is a graphical presentation of the transfer characteristics of output current versus control ampere-turns of the alternate embodiment of FIGURE 4.

In FIGURE 4 there is provided another embodiment of the invention wherein in addition to resistive element 33' being connected across gate windings 15' and 17', there is provided a resistive element 35 having a negative temperature coefficient inserted in series between one end of load resistor 27' and the center-tap 23' on the winding of transformer 25' and placed in the vicinity of the saturable reactors. Insertion of resistive element 35 in series with load resistor 27' tends to correct for any variations in amplifier gain caused by the insertion of resistive element 33' in the circuit. Said resistive element 35 tends to raise the maximum load current at high ambient temperatures and will tend to lower the maximum load current at low ambient temperatures. In the embodiment shown in FIGURE 4, resistive element 33' is chosen such that the characteristic curves A, B and C cross over at a relatively small load current. In FIGURE 5 there is shown the transfer characteristics A and C obtainable by means of the circuitry of FIGURE 4. For reasons of simplicity only characteristic curves A and C are shown therein.

Figure 6:
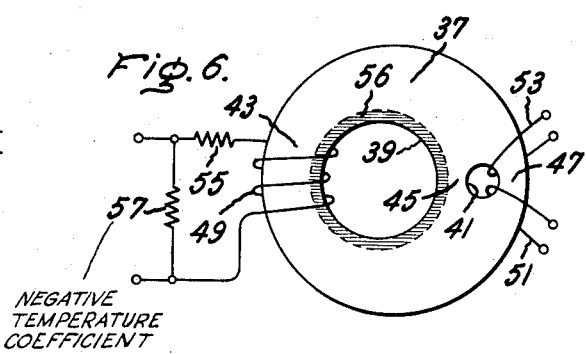
FIGURE 6 is a wiring diagram illustrating still another embodiment of the present invention.

It is to be understood that the use of resistive elements having negative temperature coefficients in parallel with the gate windings of the saturable reactors is not limited to magnetic amplifiers but the invention can be practiced with various circuits employing saturable reactors of square-loop core material in order to minimize variations in operational performance. In FIGURE 6 there is shown the employment of such resistive elements in conjunction with a transfluxor. As shown therein said transfluxor comprises a disc of ferrite material 37 having apertures 39 and 41 therein. Three paths or legs 43, 45 and 47 are formed by these apertures. Windings 49, 51 and 53 are placed on disc 37, winding 49 being the setting or signal winding, winding 51 being the output winding, and winding 53 being the A.-C. input winding.

When a pulse signal or pulse current that is large enough to saturate legs 45 and 47 of disc 37 in the clockwise direction is applied to the terminals of winding 49 and an alternating current input is fed to winding 53, no output will occur on winding 51 because no flux change is possible around legs 45 and 47. However, when a signal pulse having a particular current rating is applied to winding 49, said current being large enough acting in a clockwise sense to reverse the flux in the shaded zone 56, then a transfer of flux from path 45 to path 47 and, vice versa, is possible, resulting in an output voltage on winding 51. Such output voltage depends on the width of zone 56 in which the flux is reversed. The larger the width of said zone the larger will be the output voltage appearing on winding 51.

It will be observed from the foregoing considerations that a change in coercive force may cause an appreciable influence on the width of zone 56 for a given input current pulse applied to winding 49. Because the coercive force decreases with increases in temperature, zone 56 will become wider and a larger output voltage will appear at winding 51 than at low temperature. In order to prevent an increase in the width of zone 56, the setting pulse must be smaller at higher temperatures than at lower temperatures.

In accordance with the basic principle of this invention, resistive element 57 having a negative temperature coefficient is connected across signal winding 49 and placed in the same temperature environment. Further, a resistive element 55 is inserted in series between one end of the winding 49 and the junction of resistive element 57 with the end of said winding. Resistive element 57 compensates for changes in ambient temperature. Said resistive element will by-pass an increasing amount of the applied current pulse with increases in temperature and, therefore, lower the pulse current in winding 49. In addition, because winding 49 must be driven by an enforced current, fixed resistor 55 should be of sufficient size, and, must be connected in series with the winding before resistive element 57 is connected in parallel with said winding. In this connection, resistive element 57 can comprise a network of fixed resistors in combination with a thermistor (not shown) to secure the proper temperature characteristics desired.

From the foregoing description it is seen that temperature-compensating means in the form of resistive elements having negative temperature coefficients is provided for minimizing changes of coercive force of saturable reactors with ambient temperature. While particular embodiments of the invention have been shown and described herein it is not intended that the invention be limited to such disclosures but that changes and modifications can be made and incorporated within the scope of the claims.

What is claimed is:

1. In combination with a saturable reactor including a magnetic core having a control winding thereon, a gate winding on said magnetic core arranged to gate the output signal, means to apply signals in series to a load and said gate winding, and a core temperature compensating resistive element having a negative temperature coefficient connected in parallel with said gate winding and arranged to compensate for variations in core temperature so as to maintain constant gate winding characteristics.

2. In combination with a saturable reactor including a plurality of magnetic cores having a control winding thereon, a gate winding on each of said magnetic cores, and a resistive core temperature compensating element having a negative temperature coefficient connected in parallel with each of said gate windings and placed in the same temperature environment as said core.

3. In combination with a saturable reactor including at least two magnetic cores having a control winding thereon, a gate winding on each of said magnetic cores, said gate windings being series connected, and a core temperature compensating resistive element having a negative temperature coefficient connected across said series-connected gate windings and placed in the same temperature environment as said core.

4. In combination with a magnetic core having a plurality of windings thereon, a gate winding on said magnetic core, and a core temperature compensating resistive element having a negative temperature selected to maintain the sum of the current in said gate windings and the current in said resistive element substantially constant over a substantial temperature range coefficient in parallel with said gate windings and placed in the same temperature environment as said core.

5. In combination with a saturable reactor including a magnetic core having a control winding thereon, a gate winding on said magnetic core, load means coupled to said saturable reactor, and a plurality of core temperature compensating resistive elements each having a negative temperature coefficient, one of said resistive elements being connected in parallel with said gate winding and placed in the same temperature environment as said core, another of said resistive elements being connected in series with said load means and placed in the same temperature environment as said core.

6. A temperature-compensated saturable reactor comprising a pair of magnetic cores having a control winding thereon, a gate winding on each of said magnetic cores, said gate windings being series connected, and a core temperature compensating resistive element having a negative temperature coefficient in parallel with each of said gate windings and placed in the same temperature environment as said core.

7. A temperature-compensated saturable reactor comprising a magnetic core having a plurality of windings thereon, a gate winding on said magnetic core arranged to gate the output signal, means to apply signals in series to a load and said gate winding, and a core temperature compensating thermistor in parallel with said gate winding and arranged to compensate for variations in core temperature so as to maintain constant gate winding characteristics.

8. A temperature-compensated magnetic amplifier comprising a pair of magnetic cores each having a control winding thereon, a gate winding on each of said magnetic cores, said gate windings being series connected, a rectifier in series with one end of each of said gate windings, and a core temperature compensating resistive element selected to maintain the sum of the current in said gate windings and the current in said resistive element substantially constant over a substantial temperature range having a negative temperature coefficient in parallel with said series-connected gate windings and placed in the same temperature environment as said core.

References Cited in the file of this patent

UNITED STATES PATENTS

| | | |
|---|---|---|
| 2,548,579 | Bedford | Apr. 10, 1951 |
| 2,651,018 | La Marche | Sept. 1, 1953 |
| 2,686,287 | Gerg | Aug. 10, 1954 |
| 2,725,519 | Lalick et al. | Nov. 29, 1955 |
| 2,733,306 | Bedford | Jan. 31, 1956 |
| 2,765,119 | Marvin | Oct. 2, 1956 |
| 2,769,092 | Pruitt | Oct. 30, 1956 |
| 2,852,732 | Weiss | Sept. 16, 1958 |

UNITED STATES PATENT OFFICE
CERTIFICATE OF CORRECTION

Patent No. 3,122,700                                February 25, 1964

Vincent T. Gabriel et al.

It is hereby certified that error appears in the above numbered patent requiring correction and that the said Letters Patent should read as corrected below.

Column 4, line 55, strike out "and a resistive core temperature compensating element" and insert instead -- and a core temperature compensating resistive element --.

Signed and sealed this 12th day of January 1965.

(SEAL)
Attest:

ERNEST W. SWIDER                               EDWARD J. BRENNER
Attesting Officer                                   Commissioner of Patents